United States Patent
Deng et al.

(10) Patent No.: US 8,625,067 B2
(45) Date of Patent: Jan. 7, 2014

(54) SEALANT APPLYING APPARATUS AND SEALANT APPLYING METHOD FOR LCD SUBSTRATE

(75) Inventors: Ming-Feng Deng, Shenzhen (CN); Yi-Zhuang Zhuang, Shenzhen (CN); Song-Xian Wen, Shenzhen (CN); Xiao-Xin Zhang, Shenzhen (CN); Shao-Yuan Zhang, Shenzhen (CN); Hao Jin, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 205 days.

(21) Appl. No.: 13/380,893

(22) PCT Filed: Dec. 5, 2011

(86) PCT No.: PCT/CN2011/083440
§ 371 (c)(1),
(2), (4) Date: Dec. 26, 2011

(87) PCT Pub. No.: WO2013/075363
PCT Pub. Date: May 30, 2013

(65) Prior Publication Data
US 2013/0128214 A1  May 23, 2013

(30) Foreign Application Priority Data
Nov. 23, 2011  (CN) .......................... 2011 1 0380205

(51) Int. Cl.
*G02F 1/1339*  (2006.01)

(52) U.S. Cl.
USPC .................. 349/190; 349/153; 349/156

(58) Field of Classification Search
USPC .................. 349/190, 153, 156, 427
See application file for complete search history.

(56) References Cited

U.S. PATENT DOCUMENTS

| | | | | |
|---|---|---|---|---|
| 6,791,660 B1 * | 9/2004 | Hayashi et al. | ............... | 349/190 |
| 2008/0002140 A1 * | 1/2008 | Motomatsu | ............... | 349/187 |
| 2008/0170197 A1 * | 7/2008 | Byun et al. | ............... | 349/189 |
| 2010/0103362 A1 * | 4/2010 | Byun et al. | ............... | 349/153 |

FOREIGN PATENT DOCUMENTS

KR  2002-0079152  * 10/2002  ............ G02F 1/1339

* cited by examiner

*Primary Examiner* — Edward Glick
*Assistant Examiner* — Sang V Nguyen
(74) *Attorney, Agent, or Firm* — Cheng-Ju Chiang (57) ABSTRACT

A sealant applying apparatus for an LCD substrate is disclosed, which comprises a first sealant spraying nozzle, a second sealant spraying nozzle and a conductive medium spraying nozzle. The first sealant spraying nozzle is fixedly spaced apart from the conductive medium spraying nozzle, the first sealant spraying nozzle, the second sealant spraying nozzle and the conductive medium spraying nozzle move together, and the first sealant spraying nozzle and the second sealant spraying nozzle are opened or closed together. A sealant applying method for an LCD substrate is further disclosed. According to the present disclosure, the sealant applying apparatus for an LCD substrate and the sealant applying method for an LCD substrate allow for uniform application of a sealant, saving of the process time and saving of the material cost.

15 Claims, 4 Drawing Sheets

SEALANT APPLYING APPARATUS AND SEALANT APPLYING METHOD FOR LCD SUBSTRATE

FIELD OF THE INVENTION

The present disclosure generally relates to a sealant applying apparatus for a liquid crystal display (LCD) substrate, and more particularly, to a sealant applying apparatus for an LCD substrate which features a high applying efficiency; and the present disclosure further relates to a sealant applying method for an LCD substrate that uses the aforesaid sealant applying apparatus for an LCD substrate.

BACKGROUND OF THE INVENTION

Nowadays, thin film transistor (TFT) LCDs (TFT-LCDs) have become a kind of important displaying platforms in modern IT products and video products. A TFT-LCD generally comprises an array substrate and a color filter (CF) substrate disposed opposite to each other as well as a liquid crystal material sandwiched between the array substrate and the CF substrate. The TFT-LCD operates mainly in the following principles: liquid crystal molecules can twist under the action of a voltage applied across the liquid crystal material between the array substrate and the CF substrate, and different light transmissivity values can be obtained by applying different voltage levels, thus achieving the purpose of displaying.

Currently, the array substrate and the CF substrate are usually assembled together through adhesion by means of a sealant, and electric signals from the CF substrate are connected to circuits on the array substrate primarily via Au balls having a radius on the order of micrometers.

In the manufacturing process of an LCD panel, usually a mother substrate of a large size is sliced into a plurality of substrates. In this process, the array substrate and the CF substrate need to be assembled together through use of the sealant. Currently, a primary sealant, a secondary sealant and a conductive medium have to be applied to the array substrate and the CF substrate. The primary sealant, which is disposed outside the displaying region, is mainly used to assemble the array substrate and the CF substrate together. The secondary sealant is mainly used to protect the array substrate and the CF substrate when they are assembled together, and will be removed when the mother substrate is sliced into substrates. The conductive medium is applied on a route of a primary frame and is usually applied during or after the process of applying the primary sealant and the secondary sealant.

Currently, there are mainly two kinds of approaches of applying the sealants and the conductive medium. The first kind of approach is to firstly apply the primary sealant and the secondary sealant and finally the conductive medium is applied; and the second kind of approach is to mix the primary sealant with the conductive medium, then apply the primary sealant and the conductive medium in a single step, and finally the secondary sealant is applied.

However, the two kinds of approaches described above have the following main problems: firstly, both the first kind of approach and the second kind of approach require at least two applying steps, which consume a long time; and secondly, the second kind of approach which mixes all the conductive medium into the primary sealant consumes a significantly increased amount of the conductive medium, so the material cost is increased, and meanwhile, because the conductive medium is also applied unnecessarily to sites of signal lines, the probability of defective products is increased and quality of the products is degraded.

SUMMARY OF THE INVENTION

To overcome the problems with the prior art that the sealant applying processes for LCD substrates consume a long time and lead to a high material cost, the present disclosure provides a sealant applying apparatus for an LCD substrate and a sealant applying method for an LCD substrate, which allow for uniform application of a sealant, saving of the process time and saving of the material cost.

To achieve the aforesaid objective, the present disclosure provides a sealant applying apparatus for an LCD substrate, which comprises a first sealant spraying nozzle, a second sealant spraying nozzle, a conductive medium spraying nozzle and an adjusting shaft. The first sealant spraying nozzle is fixedly spaced apart from the conductive medium spraying nozzle, the second sealant spraying nozzle is fixedly spaced apart from the first sealant spraying nozzle and the conductive medium spraying nozzle, and the adjusting shaft is adapted to adjust a distance between the first sealant spraying nozzle and the second sealant spraying nozzle. The first sealant spraying nozzle, the second sealant spraying nozzle and the conductive medium spraying nozzle move together, the first sealant spraying nozzle and the second sealant spraying nozzle are opened or closed together. The first sealant spraying nozzle moves along a first predetermined route to apply a first sealant to an adhesion area on the LCD substrate outside a displaying region of an LCD panel, and the second sealant spraying nozzle moves together along a second predetermined route to apply a second sealant to a slicing area outside the displaying region of the LCD panel.

According to a preferred embodiment of the present disclosure, the apparatus comprises a sealant container, and a sealant outlet of the sealant container is connected with both the first sealant spraying nozzle and the second sealant spraying nozzle and is located at a middle position between and having equal distances from the first sealant spraying nozzle and the second sealant spraying nozzle.

According to a preferred embodiment of the present disclosure, the apparatus further comprises a first sealant spraying nozzle pilot valve and a second sealant spraying nozzle pilot valve, the first sealant spraying nozzle pilot valve is adapted to control communication and disconnection between the first sealant spraying nozzle and the sealant container, and the second sealant spraying nozzle pilot valve is adapted to control the communication and disconnection between the second sealant spraying nozzle and the sealant container.

According to a preferred embodiment of the present disclosure, the apparatus further comprises a conductive medium spraying nozzle pilot valve and a conductive medium container, and the conductive medium spraying nozzle pilot valve is adapted to control communication and disconnection between the conductive medium spraying nozzle and the conductive medium container.

To achieve the aforesaid objective, the present disclosure further provides a sealant applying apparatus for an LCD substrate, which comprises a first sealant spraying nozzle, a second sealant spraying nozzle and a conductive medium spraying nozzle. The first sealant spraying nozzle is fixedly spaced apart from the conductive medium spraying nozzle, the first sealant spraying nozzle, the second sealant spraying nozzle and the conductive medium spraying nozzle move together, and the first sealant spraying nozzle and the second sealant spraying nozzle are opened or closed together.

According to a preferred embodiment of the present disclosure, the second sealant spraying nozzle is fixedly spaced apart from the first sealant spraying nozzle and the conductive medium spraying nozzle, the first sealant spraying nozzle moves along a first predetermined route to apply a first sealant to an adhesion area on the LCD substrate outside a displaying region of an LCD panel, and the second sealant spraying nozzle moves together along a second predetermined route to apply a second sealant to a slicing area outside the displaying region of the LCD panel.

According to a preferred embodiment of the present disclosure, the conductive medium spraying nozzle moves to predetermined sites in the first predetermined route to apply a conductive medium to the LCD substrate, and is closed after the application of the conductive medium at the predetermined sites is completed.

According to a preferred embodiment of the present disclosure, the apparatus further comprises an adjusting shaft for adjusting a distance between the first sealant spraying nozzle and the second sealant spraying nozzle.

According to a preferred embodiment of the present disclosure, the adjusting shaft comprises a sliding chute and fixing blocks, and the first sealant spraying nozzle and the second sealant spraying nozzle slide in the sliding chute and positions of the first sealant spraying nozzle and the second sealant spraying nozzle are adapted to be fixed in the sliding chute by means of the fixing blocks.

According to a preferred embodiment of the present disclosure, the apparatus further comprises a sealant container, and a sealant outlet of the sealant container is connected with both the first sealant spraying nozzle and the second sealant spraying nozzle and is located at a middle position between and having equal distances from the first sealant spraying nozzle and the second sealant spraying nozzle.

According to a preferred embodiment of the present disclosure, the apparatus further comprises a first sealant spraying nozzle pilot valve and a second sealant spraying nozzle pilot valve, the first sealant spraying nozzle pilot valve is adapted to control communication and disconnection between the first sealant spraying nozzle and the sealant container, and the second sealant spraying nozzle pilot valve is adapted to control the communication and disconnection between the second sealant spraying nozzle and the sealant container.

According to a preferred embodiment of the present disclosure, the apparatus further comprises a conductive medium spraying nozzle pilot valve and a conductive medium container, and the conductive medium spraying nozzle pilot valve is adapted to control communication and disconnection between the conductive medium spraying nozzle and the conductive medium container.

According to a preferred embodiment of the present disclosure, the conductive medium contained in the conductive medium container comprises a plurality of Au balls having a radius on the order of micrometers.

According to a preferred embodiment of the present disclosure, a connecting line between the first sealant spraying nozzle and the conductive medium spraying nozzle is perpendicular to or is oblique with respect to a connecting line between the first sealant spraying nozzle and the second sealant spraying nozzle.

To achieve the aforesaid objective, the present disclosure further provides a sealant applying method for an LCD substrate, which comprises the following steps of: moving a first sealant spraying nozzle, a second sealant spraying nozzle and a conductive medium spraying nozzle together, opening or closing the first sealant spraying nozzle and the second sealant spraying nozzle together, moving the first sealant spraying nozzle along a first predetermined route to apply a first sealant to the LCD substrate, and when moving the conductive medium spraying nozzle to predetermined sites in the first predetermined route during the process of moving the first sealant spraying nozzle along the first predetermined route, opening the conductive medium spraying nozzle to apply a conductive medium to the LCD substrate and closing the conductive medium spraying nozzle after the application of the conductive medium at the predetermined sites is completed.

As compared to the prior art, the sealant applying apparatus for an LCD substrate and the sealant applying method for an LCD substrate of the present disclosure have the following benefits: because the conductive medium spraying nozzle moves along with the first sealant spraying nozzle, it is unnecessary to spend additional time in moving the conductive spraying nozzle along the same route; and because the conductive spraying nozzle is only opened at predetermined sites to apply the conductive medium to the LCD substrate and is closed immediately after application of the conductive medium at the predetermined sites is completed, the amount of the conductive medium consumed is saved. Therefore, the present disclosure has the advantages of saving both the time and the cost.

DETAILED DESCRIPTION OF THE INVENTION

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 1:
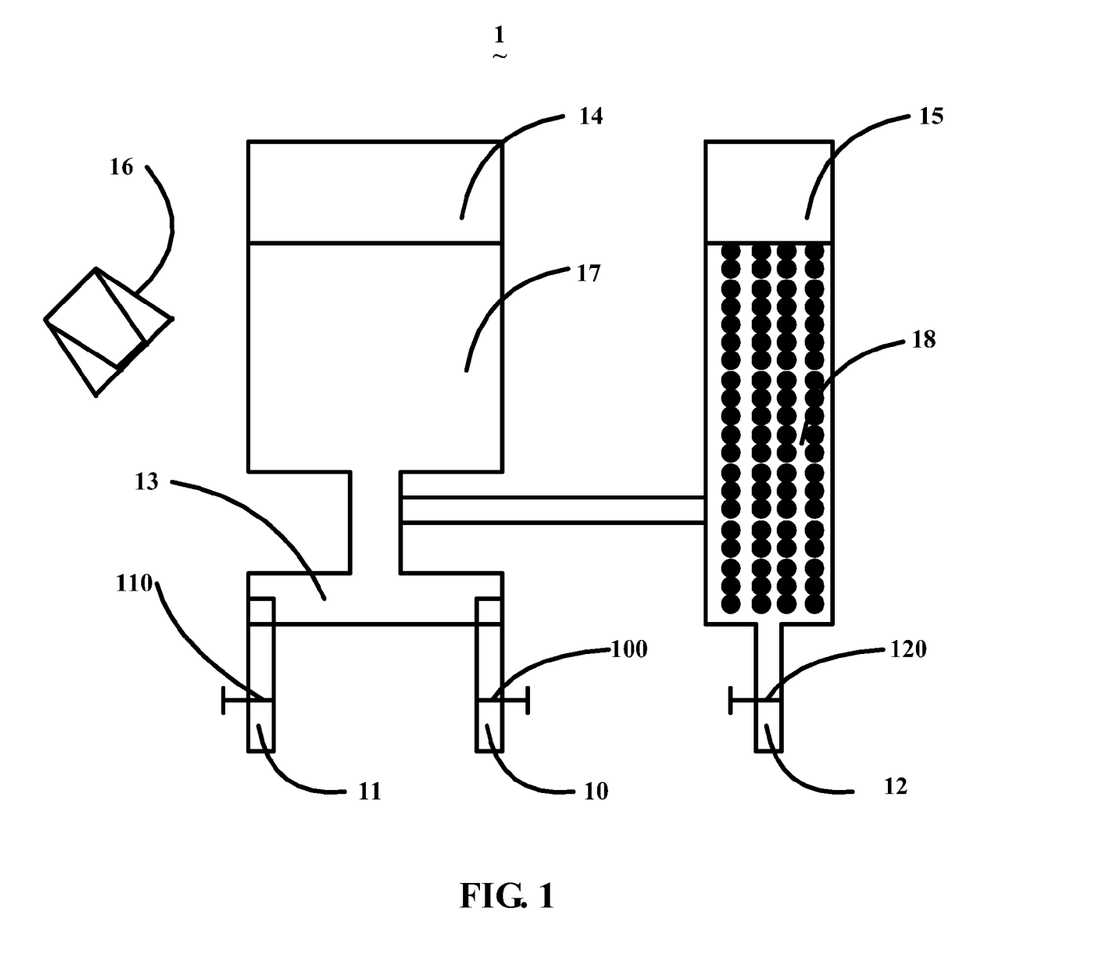
FIG. 1 is a schematic plan structural view of a preferred embodiment of a sealant applying apparatus for an LCD substrate according to the present disclosure at an oblique view angle.
Figure 2:
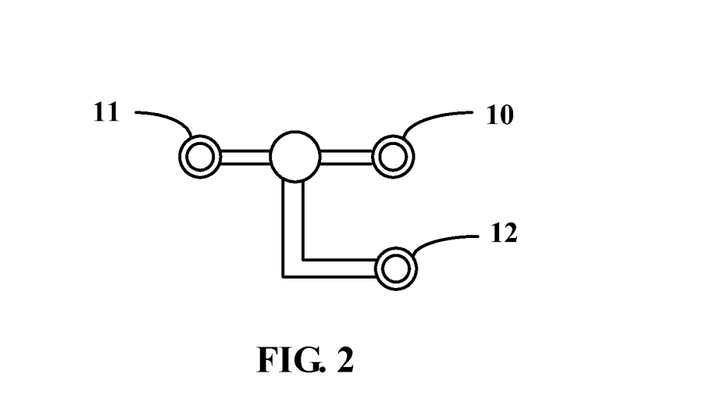
FIG. 2 is a schematic front view illustrating a way in which spraying nozzles are arranged in the sealant applying apparatus for an LCD substrate shown in FIG. 1.

Referring to FIG. 1 and FIG. 2 together, FIG. 1 is a schematic plan structural view of a preferred embodiment of a sealant applying apparatus for an LCD substrate according to the present disclosure at an oblique view angle (e.g., an angle of 135 degrees), and FIG. 2 is a schematic front view illustrating a way in which spraying nozzles are arranged in the sealant applying apparatus for an LCD substrate shown in FIG. 1. Embodiments of the sealant applying apparatus for an LCD substrate of the present disclosure are described as follows.

An embodiment of the present disclosure is a sealant applying apparatus 1 for an LCD substrate. The sealant applying apparatus 1 is adapted to apply sealants to an LCD substrate. The LCD substrate is used to fabricate an LCD panel or to be sliced into two or more LCD panels. The sealant applying apparatus 1 for an LCD substrate comprises a first sealant spraying nozzle 10, a second sealant spraying nozzle 11 and a conductive medium spraying nozzle 12.

The first sealant spraying nozzle 10 is fixedly spaced apart from the conductive medium spraying nozzle 12. During the process that the first sealant spraying nozzle 10 and the conductive medium spraying nozzle 12 move together along a first predetermined route, the conductive medium spraying nozzle 12 is opened when it moves to predetermined sites in the first predetermined route to apply a conductive medium 18 to the LCD substrate, and is closed after the application of the conductive medium 18 at the predetermined sites is completed.

The second sealant spraying nozzle 11 is fixedly spaced apart from the first sealant spraying nozzle 10 and the conductive medium spraying nozzle 12. When the first sealant spraying nozzle 10 is applying a first sealant to an adhesion area on the LCD substrate outside a displaying region of the LCD panel, the second sealant spraying nozzle 11 moves along a second predetermined route to apply a second sealant to a slicing area outside the displaying region of the LCD panel.

Figure 3:
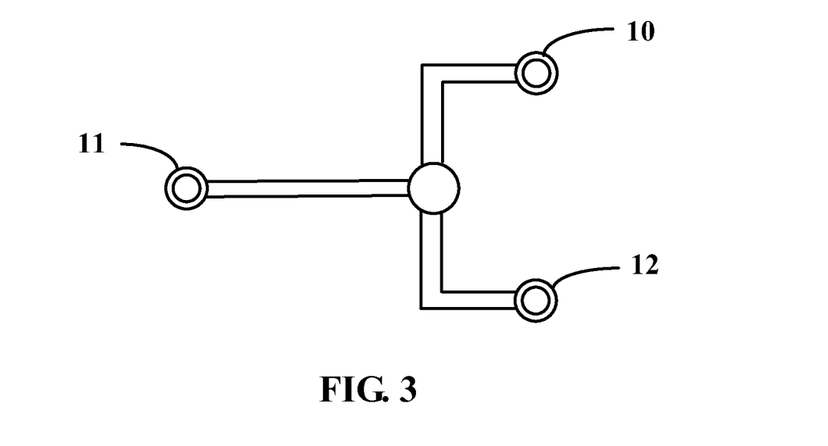
FIG. 3 is a schematic front view illustrating another way in which the spraying nozzles are arranged in the sealant applying apparatus for an LCD substrate shown in FIG. 1.

A connecting line between the first sealant spraying nozzle 10 and the conductive medium spraying nozzle 12 is perpendicular to a connecting line between the first sealant spraying nozzle 10 and the second sealant spraying nozzle 11, which arrangement is shown in FIG. 2. The connecting line between the first sealant spraying nozzle 10 and the conductive medium spraying nozzle 12 may also be oblique with respect to the connecting line between the first sealant spraying nozzle 10 and the second sealant spraying nozzle 11, which arrangement is shown in FIG. 3. FIG. 3 is a schematic front view illustrating the latter way in which the spraying nozzles are arranged in the sealant applying apparatus for an LCD substrate shown in FIG. 1. In FIG. 3, a distance between the first sealant spraying nozzle 10 and a sealant outlet (see below) of a sealant container is equal to that between the second sealant spraying nozzle 11 and the sealant outlet of the sealant container.

The sealant applying apparatus for an LCD substrate 1 further comprises an adjusting shaft 13, a sealant container 14, a first sealant spraying nozzle pilot valve 100, a second sealant spraying nozzle pilot valve 110, a conductive medium spraying nozzle pilot valve 120, a conductive medium container 15 and an alignment mark identifying unit 16.

The adjusting shaft 13 is connected with the first sealant spraying nozzle 10 and the second sealant spraying nozzle 11 respectively, and is mainly used to adjust a distance between the first sealant spraying nozzle 10 and the second sealant spraying nozzle 11 to satisfy requirements of different product manufacturing processes. As an example, the adjusting shaft 13 may be an telescopic long shaft, in which case the first sealant spraying nozzle 10 and the second sealant spraying nozzle 11 are disposed at two ends of the adjusting shaft 13 respectively. When the distance between the first sealant spraying nozzle 10 and the second sealant spraying nozzle 11 needs to be adjusted, the length of the adjusting shaft 13 can be adjusted by retracting or extending the adjusting shaft 13. As another example, the adjusting shaft 13 may comprise a sliding chute and fixing blocks. The first sealant spraying nozzle 10 and the second sealant spraying nozzle 11 can slide in the sliding chute and positions of the first sealant spraying nozzle 10 and the second sealant spraying nozzle 11 are adapted to be fixed in the sliding chute by means of the fixing blocks.

The sealant container 14 is mainly used to contain and supply a sealant 17 to the first sealant spraying nozzle 10 and the second sealant spraying nozzle 11. The sealant container 14 comprises a sealant outlet (not labeled). The sealant outlet is connected with both the first sealant spraying nozzle 10 and the second sealant spraying nozzle 11, and is located at a middle position between and having equal distances from the first sealant spraying nozzle 10 and the second sealant spraying nozzle 11. That is to say, when the sealant 17 is contained in the sealant container 14, a pressure at the first sealant spraying nozzle 10 is equal to that at the second sealant spraying nozzle 11. The sealant 17 forms a primary sealant and a secondary sealant after being applied. The primary sealant is disposed outside the displaying region of the LCD panel, and the secondary sealant is disposed at a periphery of the primary sealant.

The first sealant spraying nozzle pilot valve 100 is disposed between a spraying outlet of the first sealant spraying nozzle 10 and the sealant outlet of the sealant container 14, and is mainly used to control communication and disconnection between the first sealant spraying nozzle 10 and the sealant container 14. For example, when the first sealant spraying nozzle 10 needs to apply the sealant 17, the first sealant spraying nozzle pilot valve 100 may be controlled to be opened; and when the first sealant spraying nozzle 10 needs not to apply the sealant 17, the first sealant spraying nozzle pilot valve 100 may be controlled to be closed. Similarly, the second sealant spraying nozzle pilot valve 110 is disposed between a spraying outlet of the second sealant spraying nozzle 11 and the sealant outlet of the sealant container 14, and is mainly used to control communication and disconnection between the second sealant spraying nozzle 11 and the sealant container 14. For example, when the second sealant spraying nozzle 11 needs to apply the sealant 17, the second sealant spraying nozzle pilot valve 110 may be controlled to be opened; and when the second sealant spraying nozzle 11 needs not to apply the sealant 17, the second sealant spraying nozzle pilot valve 110 may be controlled to be closed. The first sealant spraying nozzle pilot valve 100 and the second sealant spraying nozzle pilot valve 110 may be mechanical pilot valves or electronic switch pilot valves.

The conductive medium container 15, whose main function is similar to that of the sealant container 14, is mainly used to contain and supply the conductive medium 18 to the conductive medium spraying nozzle 12. The conductive medium container 15 comprises an outlet (not labeled) communicating with the conductive medium spraying nozzle 12. The conductive medium 18 contained in the conductive medium container 15 comprises a plurality of Au balls having a radius on the order of micrometers.

The conductive medium spraying nozzle pilot valve 120 is disposed between a spraying outlet of the conductive medium spraying nozzle 12 and the outlet of the conductive medium container 15, and is mainly used to control communication and disconnection between the conductive medium spraying nozzle 12 and the conductive medium container 15. For example, when the conductive medium spraying nozzle 12 needs to apply the conductive medium 18, the conductive medium spraying nozzle pilot valve 120 may be controlled to be opened; and when the conductive medium spraying nozzle 12 needs not to apply the conductive medium 18, the conductive medium spraying nozzle pilot valve 120 may be controlled to be closed.

The alignment mark identifying unit 16 is mainly used to identify alignment marks on the LCD substrate. In order to be aligned accurately when being assembled together or sliced, the LCD substrate is usually formed with the alignment marks. For example, four cross-shaped alignment marks are disposed at four corners of the LCD substrate respectively. The alignment mark identifying unit 16 may be a charge coupled device (CCD) camera connected with a control device (not shown).

Figure 4:
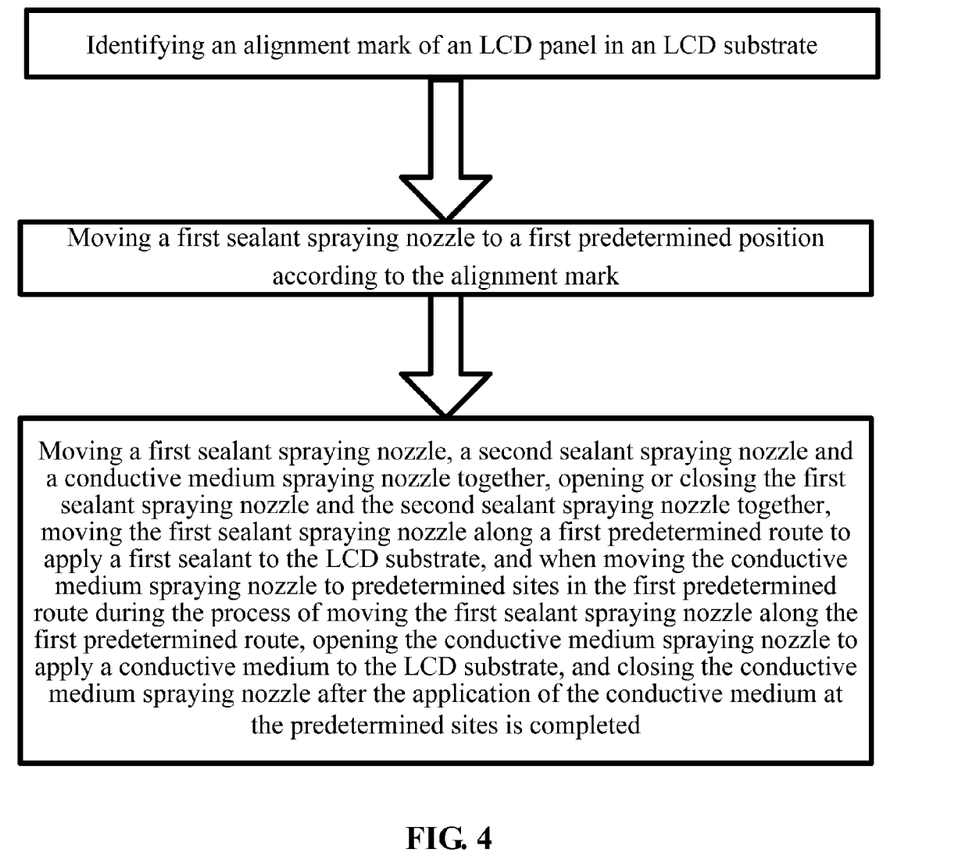
FIG. 4 is a schematic view illustrating steps of a preferred embodiment of a sealant applying method for an LCD substrate according to the present disclosure.

Referring to FIG. 4, a schematic view illustrating steps of a preferred embodiment of a sealant applying method for an LCD substrate according to the present disclosure is shown therein. The sealant applying method for an LCD substrate uses the sealant applying apparatus for an LCD substrate 1 according to the embodiment of the present disclosure to apply sealants to an LCD substrate, and comprises the following steps: moving a first sealant spraying nozzle 10, a second sealant spraying nozzle 11 and a conductive medium spraying nozzle 12 together, opening or closing the first sealant spraying nozzle 10 and the second sealant spraying nozzle 12 together, moving the first sealant spraying nozzle 10 along a first predetermined route to apply a first sealant to the LCD substrate, and when moving the conductive medium spraying nozzle 12 to predetermined sites in the first predetermined route during the process of moving the first sealant spraying nozzle 10 along the first predetermined route, opening the conductive medium spraying nozzle 12 to apply a conductive medium 18 to the LCD substrate and closing the conductive medium spraying nozzle 12 after the application of the conductive medium 18 at the predetermined sites is completed.

The step of moving the first sealant spraying nozzle 10 along the first predetermined route to apply the first sealant to the LCD substrate comprises the following steps: moving the first sealant spraying nozzle 10 along the first predetermined route to apply the first sealant to an area on the LCD substrate outside a displaying region of an LCD panel, and moving the second sealant spraying nozzle 11 along a second predetermined route to apply a second sealant to the area outside the displaying region of the LCD panel. Depending on different process requirements, the step of moving the second sealant spraying nozzle 11 along the second predetermined route to apply the second sealant to the area outside the displaying region of the LCD panel may be carried out at the same time as, before or after the step of moving the first sealant spraying nozzle 10 to apply the first sealant, and may also carried out in only a part of the time when the first sealant spraying nozzle 10 applies the first sealant.

Of course, the method further comprises the following step before the steps of moving the first sealant spraying nozzle 10 along the first predetermined route to apply the first sealant to the LCD substrate and moving the second sealant spraying nozzle 11 along the second predetermined route to apply the first sealant to the LCD panel: identifying the alignment marks of the LCD panel in the LCD substrate; and moving the first sealant spraying nozzle 10 to first predetermined positions (also serving as predetermined sites for applying the conductive medium 18, see below) and moving the second sealant spraying nozzle 11 to second predetermined positions (also serving as the predetermined sites for applying the conductive medium 18, see below) according to the alignment marks.

Figure 5:
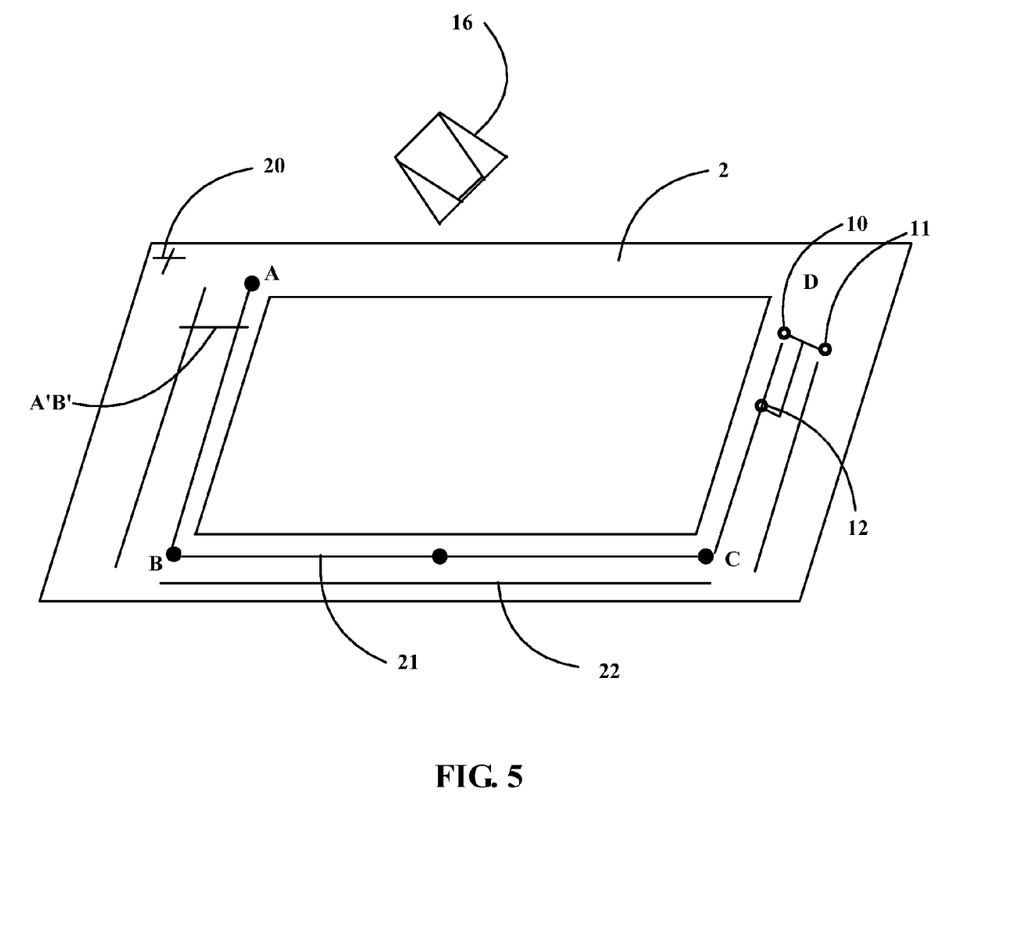
FIG. 5 is a schematic view illustrating how sealants are applied to an LCD substrate according to the sealant applying method for an LCD substrate of the present disclosure.

Referring to FIG. 5, a schematic view illustrating how sealants are applied to an LCD substrate according to the sealant applying method for an LCD substrate of the present disclosure is shown therein. Referring to FIG. 1 together, how the sealant applying method for an LCD substrate uses the sealant applying apparatus for an LCD substrate 1 of the embodiment of the present disclosure to apply a sealant 17 to an LCD substrate will be described with reference to an example hereinafter. In FIG. 5, a top left corner of an LCD substrate 2 is formed with an alignment mark 20 which can be identified by the alignment mark identifying unit 16 so as to identify a starting point for applying the sealant 17. The first sealant spraying nozzle 10 moves along the first predetermined route to apply the sealant 17 to form a primary sealant 21 (i.e., the first sealant) located on an inner side, and the second sealant spraying nozzle 11 moves along the second predetermined route to apply the sealant 17 to form a secondary sealant 22 (i.e., the second sealant). Here, it is assumed that the applying order is A→B→C→D→A as shown in FIG. 5.

Firstly, after the alignment mark identifying unit 16 has identified the position of the align mark 20, the first sealant spraying nozzle 10 and the second sealant spraying nozzle 11 are moved to the point A to get ready for applying the sealant 17. In the initial state, the first sealant spraying nozzle pilot valve 100, the second sealant spraying nozzle pilot valve 110 and the conductive medium spraying nozzle pilot valve 120 are all closed. During the process of moving from the point A to a point B, the first sealant spraying nozzle pilot valve 100 and the second sealant spraying nozzle pilot valve 110 are both opened so that the first sealant spraying nozzle 10 applies the primary sealant 21 and the second sealant spraying nozzle 11 applies the secondary sealant 22. When the first sealant spraying nozzle pilot valve 100 and the second sealant spraying nozzle pilot valve 110 has moved to a position A'B' located between the point A and the point B, the conductive medium spraying nozzle pilot valve 120 is opened, and the conductive medium drips to and is applied to the point A under the action of an appropriate pressure applied. Then, the conductive medium spraying nozzle pilot valve 120 is closed after the application of the conductive medium 18 at the point A is completed.

A plurality of other predetermined sites are also disposed in the first predetermined route in addition to the point A. Similarly, after the application from the point A to the point B is completed, the first sealant spraying nozzle 10 and the second sealant spraying nozzle 11 keep moving and the conductive medium spraying nozzle 12 moves along with the first sealant spraying nozzle 10. The conductive medium spraying nozzle 12 applies the conductive medium 18 to the LCD substrate 2 when moving to the plurality of other predetermined sites respectively (e.g., the point B, a point C and sites between the point B and the point C), and is closed after the application of the conductive medium 18 at the predetermined sites is completed.

As compared to the prior art, the sealant applying apparatus for an LCD substrate and the sealant applying method for an LCD substrate of the present disclosure apply the primary sealant and the secondary sealant in a single applying step. Moreover, in the process of applying the primary sealant, the conductive medium spraying nozzle is opened to apply the conductive medium to the LCD substrate only when the conductive medium spraying nozzle is moved to the predetermined sites that need to be applied, and is closed after application of the conductive medium at the predetermined sites is completed. That is to say, the application of the primary sealant, the secondary sealant and the conductive medium are completed in one applying cycle, which avoids the problem of consuming much time when the aforesaid application is completed in a plurality of applying cycles and improves the applying efficiency obviously. Furthermore, as the conductive medium and the sealants are contained in separate containers, the conductive medium is applied only to the sites where the conductive medium is needed so that the amount of the conductive medium consumed can be controlled accurately, and this decreases the material cost obviously. When used in the large-size LCD panels such as the 47-inch LCD panel produced on the eighth generation (8G) LCD panel production line, the sealant applying apparatus for an LCD substrate and the sealant applying method for an LCD substrate of the present disclosure have particularly prominent advantages, and can save the labor time and the material significantly.

Accordingly, the sealant applying apparatus for an LCD substrate and the sealant applying method for an LCD substrate of the present disclosure have the advantages of saving both the process time and the material cost.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A sealant applying apparatus for a liquid crystal display (LCD) substrate, comprising:
    a first sealant spraying nozzle, a second sealant spraying nozzle, a conductive medium spraying nozzle and an adjusting shaft;
    wherein the first sealant spraying nozzle is fixedly spaced apart from the conductive medium spraying nozzle, the second sealant spraying nozzle is fixedly spaced apart from the first sealant spraying nozzle and the conductive medium spraying nozzle, and the adjusting shaft is adapted to adjust a distance between the first sealant spraying nozzle and the second sealant spraying nozzle; and
    the first sealant spraying nozzle, the second sealant spraying nozzle and the conductive medium spraying nozzle move together, the first sealant spraying nozzle and the second sealant spraying nozzle are opened or closed together, the first sealant spraying nozzle moves along a first predetermined route to apply a first sealant to an adhesion area on the LCD substrate outside a displaying region of an LCD panel, and the second sealant spraying nozzle moves together along a second predetermined route to apply a second sealant to a slicing area outside the displaying region of the LCD panel.

2. The sealant applying apparatus for an LCD substrate of claim 1, wherein the apparatus comprises a sealant container, a sealant outlet of the sealant container is connected with both the first sealant spraying nozzle and the second sealant spraying nozzle and is located at a middle position between and having equal distances from the first sealant spraying nozzle and the second sealant spraying nozzle.

3. The sealant applying apparatus for an LCD substrate of claim 2, wherein the apparatus further comprises a first sealant spraying nozzle pilot valve and a second sealant spraying nozzle pilot valve, the first sealant spraying nozzle pilot valve is adapted to control communication and disconnection between the first sealant spraying nozzle and the sealant container, and the second sealant spraying nozzle pilot valve is adapted to control the communication and disconnection between the second sealant spraying nozzle and the sealant container.

4. The sealant applying apparatus for an LCD substrate of claim 1, wherein the apparatus further comprises a conductive medium spraying nozzle pilot valve and a conductive medium container, and the conductive medium spraying nozzle pilot valve is adapted to control communication and disconnection between the conductive medium spraying nozzle and the conductive medium container.

5. A sealant applying apparatus for an LCD (liquid crystal display) substrate, comprising a first sealant spraying nozzle, a second sealant spraying nozzle and a conductive medium spraying nozzle, wherein the first sealant spraying nozzle is fixedly spaced apart from the conductive medium spraying nozzle, the first sealant spraying nozzle, the second sealant spraying nozzle and the conductive medium spraying nozzle move together, and the first sealant spraying nozzle and the second sealant spraying nozzle are opened or closed together.

6. The sealant applying apparatus for an LCD substrate of claim 5, wherein the second sealant spraying nozzle is fixedly spaced apart from the first sealant spraying nozzle and the conductive medium spraying nozzle, the first sealant spraying nozzle moves along a first predetermined route to apply a first sealant to an adhesion area on the LCD substrate outside a displaying region of an LCD panel, and the second sealant spraying nozzle moves together along a second predetermined route to apply a second sealant to a slicing area outside the displaying region of the LCD panel.

7. The sealant applying apparatus for an LCD substrate of claim 6, wherein the conductive medium spraying nozzle moves to predetermined sites in the first predetermined route to apply a conductive medium to the LCD substrate, and is closed after the application of the conductive medium at the predetermined sites is completed.

8. The sealant applying apparatus for an LCD substrate of claim 5, wherein the apparatus further comprises an adjusting shaft for adjusting a distance between the first sealant spraying nozzle and the second sealant spraying nozzle.

9. The sealant applying apparatus for an LCD substrate of claim 8, wherein the adjusting shaft comprises a sliding chute and fixing blocks, and the first sealant spraying nozzle and the second sealant spraying nozzle slide in the sliding chute and positions of the first sealant spraying nozzle and the second sealant spraying nozzle are adapted to be fixed in the sliding chute by means of the fixing blocks.

10. The sealant applying apparatus for an LCD substrate of claim 5, wherein the apparatus further comprises a sealant container, a sealant outlet of the sealant container is connected with both the first sealant spraying nozzle and the second sealant spraying nozzle and is located at a middle position between and having equal distances from the first sealant spraying nozzle and the second sealant spraying nozzle.

11. The sealant applying apparatus for an LCD substrate of claim 10, wherein the apparatus further comprises a first sealant spraying nozzle pilot valve and a second sealant spraying nozzle pilot valve, the first sealant spraying nozzle pilot valve is adapted to control communication and disconnection between the first sealant spraying nozzle and the sealant container, and the second sealant spraying nozzle pilot valve is adapted to control the communication and disconnection between the second sealant spraying nozzle and the sealant container.

12. The sealant applying apparatus for an LCD substrate of claim 5, wherein the apparatus further comprises a conductive medium spraying nozzle pilot valve and a conductive medium container, and the conductive medium spraying nozzle pilot valve is adapted to control communication and disconnection between the conductive medium spraying nozzle and the conductive medium container.

13. The sealant applying apparatus for an LCD substrate of claim 12, wherein the conductive medium contained in the conductive medium container comprises a plurality of Au balls having a radius on the order of micrometers.

14. The sealant applying apparatus for an LCD substrate of claim 5, wherein a connecting line between the first sealant spraying nozzle and the conductive medium spraying nozzle is perpendicular to or is oblique with respect to a connecting line between the first sealant spraying nozzle and the second sealant spraying nozzle.

15. A sealant applying method for an LCD (liquid crystal display) substrate, comprising the following steps of:

moving a first sealant spraying nozzle, a second sealant spraying nozzle and a conductive medium spraying nozzle together, opening or closing the first sealant spraying nozzle and the second sealant spraying nozzle together, moving the first sealant spraying nozzle along a first predetermined route to apply a first sealant to the LCD substrate, and when moving the conductive medium spraying nozzle to predetermined sites in the first predetermined route during the process of moving the first sealant spraying nozzle along the first predetermined route, opening the conductive medium spraying nozzle to apply a conductive medium to the LCD substrate, and closing the conductive medium spraying nozzle after the application of the conductive medium at the predetermined sites is completed.

* * * * *